(12) United States Patent
Atighetchi et al.

(10) Patent No.: US 11,595,410 B2
(45) Date of Patent: Feb. 28, 2023

(54) FRAGMENTED CROSS-DOMAIN SOLUTION

(71) Applicant: Raytheon BBN Technologies Corp., Cambridge, MA (US)

(72) Inventors: Michael Hassan Atighetchi, Framingham, MA (US); Joud Khoury, Boston, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 430 days.

(21) Appl. No.: 16/809,041

(22) Filed: Mar. 4, 2020

(65) Prior Publication Data
US 2021/0281581 A1 Sep. 9, 2021

(51) Int. Cl.
*H04L 9/40* (2022.01)

(52) U.S. Cl.
CPC .......... *H04L 63/1416* (2013.01); *H04L 63/10* (2013.01); *H04L 63/20* (2013.01)

(58) Field of Classification Search
CPC ..... H04L 63/1416; H04L 63/10; H04L 63/20; H04L 63/105; H04W 12/009; H04W 12/086; H04W 12/088
See application file for complete search history.

(56) References Cited

U.S. PATENT DOCUMENTS

| | | | | |
|---|---|---|---|---|
| 2004/0100957 A1* | 5/2004 | Huang | | H04L 45/32 370/392 |
| 2004/0230791 A1* | 11/2004 | Boebert | | G06F 21/606 713/150 |
| 2007/0271212 A1* | 11/2007 | Jones | | G06F 21/6227 707/999.009 |
| 2009/0249220 A1 | 10/2009 | Golle et al. | | |
| 2010/0192217 A1* | 7/2010 | Arnold | | H04L 63/30 726/13 |
| 2010/0296444 A1* | 11/2010 | Masiyowski | | H04L 63/30 370/328 |
| 2011/0314536 A1* | 12/2011 | Kuckelman | | H04L 63/1433 726/11 |
| 2012/0204035 A1 | 8/2012 | Camenisch et al. | | |

(Continued)

OTHER PUBLICATIONS

Kim et al., "Trusted Military Services Based on the Secure Domain of the Mobile Security Solution", Oct. 2015, International Conference on Information and Communication Technology Convergence, pp. 1125-1128 (Year: 2015).*

*Primary Examiner* — Kenneth W Chang
(74) *Attorney, Agent, or Firm* — Lando & Anastasi, LLP

(57) ABSTRACT

Techniques for cross-domain routing using a fractionated cross-domain solution (F-CDS) are disclosed. A first intermediate node operating in a first physical device in an assured pipeline of the F-CDS receives a data item originating at a source node in a first security domain. The first intermediate node applies a first data filter to determine that the data item complies with a data security requirement of the F-CDS. The first intermediate node transmits the data item to a second intermediate node operating in a second physical device in the assured pipeline of the F-CDS. The second intermediate node applies a second data filter to redundantly determine that first data item complies with the data security requirement of the F-CDS. The second intermediate node transmits the data item to a recipient node in a second security domain via the assured pipeline.

20 Claims, 10 Drawing Sheets

(56) References Cited

U.S. PATENT DOCUMENTS

2012/0291089 A1* 11/2012 Bomgardner ....... G06F 21/6236
   726/1
2014/0337410 A1* 11/2014 Mraz ..................... H04L 63/20
   709/203
2015/0156206 A1*  6/2015 Redlich ................. G06F 16/26
   726/29

* cited by examiner

FRAGMENTED CROSS-DOMAIN SOLUTION

BACKGROUND

Many types of operations demand seamless exchange and integration of information across multiple operating domains (e.g., air, space, ground, and cyber), multiple security domains, and diverse execution loci (e.g., enterprise, forward operating bases, and tactical edge). Examples of such operations include military operations, disaster relief, etc. In adversarial operations, the exchange and integration of information may need to happen at speeds exceeding adversarial decision cycles. For example, troops may need to rapidly and securely share information with mission partners.

A cross-domain solution (CDS) is a set of hardware and/or software that allows for transmission of data across a security domain boundary. Devices in the field often lack the computing resources to implement full CDS functionality. Accordingly, typical CDS's include enterprise CDS (E-CDS) and tactical CDS (T-CDS). An E-CDS operates in an enterprise environment, outside of the field environment, and performs all of the CDS functions for devices in the field. A T-CDS operates within a single device in the field environment, and similarly performs all of the CDS functions for other devices in the field. If a device in the field does not have a network connection to an E-CDS or T-CDS, or the network connection is disrupted or otherwise unreliable, then the device is unable to safely and reliably communicate across security domains in the field. For example, in a dynamic and contested edge environment, mobile assets may be disconnected from each other and from the enterprise. Such changes may be unpredictable and difficult to remediate in a sufficiently timely manner. Lack of access to a CDS may impede mission execution and the exchange of mission-critical information with partners in the field.

Approaches described in this section have not necessarily been conceived and/or pursued prior to the filing of this application. Accordingly, unless otherwise indicated, approaches described in this section should not be construed as prior art.

SUMMARY

One or more embodiments include a fragmented cross-domain solution (CDS). Instead of executing in an enterprise environment (e.g., E-CDS) and/or in a single trusted device (e.g., T-CDS), an F-CDS fragments CDS functionality into constituent elements and distributes those parts across multiple devices in the field. Two or more F-CDS nodes (i.e., devices that include F-CDS elements) may be redundant and/or heterogenous with respect to each other. An F-CDS may thus take advantage of the diversity and redundancy of devices in the field, as well as strong isolation guarantees derived from hardware separation. An F-CDS may operate without any single node being required to host multiple security domains. By distributing CDS functionality, an F-CDS may increase the chances that devices are able to securely and rapidly exchange information across security domains in the field.

In some embodiments, cross-domain discovery and routing (D&R) techniques help identify assured pipelines through F-CDS nodes and route data through those assured pipelines. Assured pipelines may change as the connectivity and availability of F-CDS nodes change over the course of an operation (e.g., a mission). For example, in a contested network environment, as mobile devices are partitioned from each other, the remaining communication paths may still provide access to an assured pipeline. In an assured pipeline, an F-CDS is still able to execute CDS operations such as filtering, auditing, sanitization, and transformation.

In an embodiment, an F-CDS complies with the RAIN principle (redundant, always invoked, independent implementations, and non-bypassable, as described in further detail below), whereby the CDS components are redundant, always invoked, independent implementations, and non-bypassable. An assured pipeline in an F-CDS may use fault-tolerant computing and cryptography to help mitigate the risks associated with an F-CDS node being compromised. For example, an assured pipeline may help mitigate potential loss of data (from high to low security domains) or escalation of privilege (from low to high security domains) across a collection of F-CDS elements. D&R and F-CDS operations may provide strong information protection guarantees, as information being routed across an untrusted network passes between multiple independent filters with enforced unidirectional communication. A system that includes an F-CDS may continue to use E-CDS and/or T-CDS when available.

In general, in one aspect, one or more non-transitory machine-readable media store instructions that, when executed by one or more processors, cause: receiving, by a first intermediate node operating in a first physical device in a first assured pipeline of a fragmented cross-domain solution (CDS), a data item originating at a source node in a first security domain; applying, by the first intermediate node, a first data filter to determine that the first data item complies with a data security requirement of the fragmented CDS; transmitting, by the first intermediate node, the first data item to a second intermediate node operating in a second physical device in the first assured pipeline of the fragmented CDS; applying, by the second intermediate node, a second data filter to redundantly determine that the first data item complies with the data security requirement of the fragmented CDS; and transmitting, by the second intermediate node, the first data item to a recipient node in a second security domain via the first assured pipeline.

The one or more non-transitory machine-readable media may further store instructions that, when executed by one or more processors, cause: sanitizing, by a third intermediate node operating in a third physical device in the first assured pipeline of the fragmented CDS, the first data item to mitigate a first malicious attack vector; and transforming, by a fourth intermediate node operating in a fourth physical device in the first assured pipeline of the fragmented CDS, the first data item from a first data type to a second data type, to mitigate a second malicious attack vector.

The one or more non-transitory machine-readable media may further store instructions that, when executed by one or more processors, cause: receiving, by a cross-domain router in the fragmented CDS, multiple status messages from multiple nodes in the fragmented CDS, the status messages indicating respective data filtering capabilities of the nodes in the fragmented CDS; and determining, by the cross-domain router based at least on the status messages, that the first assured pipeline satisfies a minimum security requirement for routing the first data item from the source node in the first security domain to the recipient node in the second security domain.

The one or more non-transitory machine-readable media may further store instructions that, when executed by one or more processors, cause: enforcing attribute-based access control for the first data item along the first assured pipeline.

The one or more non-transitory machine-readable media may further store instructions that, when executed by one or more processors, cause: enforcing a one-way data flow policy along the first assured pipeline.

The one or more non-transitory machine-readable media may further store instructions that, when executed by one or more processors, cause: routing a second data item from the source node in the first security domain to the recipient node in the second security domain, via a second assured pipeline in the fractionated CDS, wherein routing the second data item comprises applying, by a third intermediate node operating in a third physical device in the second assured pipeline that is different from any node in the first assured pipeline, the first data filter to determine that the second data item complies with the data security requirement of the fragmented CDS.

Transmitting the first data item to the second intermediate node in the first assured pipeline of the fragmented CDS may include transmitting the first data item to a group of nodes in the fractionated CDS that are neighbors to a transmitting node.

In general, in one aspect, a system includes: at least one device including a hardware processor; the system being configured to perform operations including: receiving, by a first intermediate node operating in a first physical device in a first assured pipeline of a fragmented cross-domain solution (CDS), a data item originating at a source node in a first security domain; applying, by the first intermediate node, a first data filter to determine that the first data item complies with a data security requirement of the fragmented CDS; transmitting, by the first intermediate node, the first data item to a second intermediate node operating in a second physical device in the first assured pipeline of the fragmented CDS; applying, by the second intermediate node, a second data filter to redundantly determine that the first data item complies with the data security requirement of the fragmented CDS; and transmitting, by the second intermediate node, the first data item to a recipient node in a second security domain via the first assured pipeline.

The operations may further include: sanitizing, by a third intermediate node operating in a third physical device in the first assured pipeline of the fragmented CDS, the first data item to mitigate a first malicious attack vector; and transforming, by a fourth intermediate node operating in a fourth physical device in the first assured pipeline of the fragmented CDS, the first data item from a first data type to a second data type, to mitigate a second malicious attack vector.

The operations may further include: receiving, by a cross-domain router in the fragmented CDS, multiple status messages from multiple nodes in the fragmented CDS, the status messages indicating respective data filtering capabilities of the nodes in the fragmented CDS; and determining, by the cross-domain router based at least on the status messages, that the first assured pipeline satisfies a minimum security requirement for routing the first data item from the source node in the first security domain to the recipient node in the second security domain.

The operations may further include: enforcing attribute-based access control for the first data item along the first assured pipeline.

The operations may further include: enforcing a one-way data flow policy along the first assured pipeline.

The operations may further include: routing a second data item from the source node in the first security domain to the recipient node in the second security domain, via a second assured pipeline in the fractionated CDS, wherein routing the second data item comprises applying, by a third intermediate node operating in a third physical device in the second assured pipeline that is different from any node in the first assured pipeline, the first data filter to determine that the second data item complies with the data security requirement of the fragmented CDS.

Transmitting the first data item to the second intermediate node in the first assured pipeline of the fragmented CDS may include transmitting the first data item to a group of nodes in the fractionated CDS that are neighbors to a transmitting node.

In general, in one aspect, a method includes: receiving, by a first intermediate node operating in a first physical device in a first assured pipeline of a fragmented cross-domain solution (CDS), a data item originating at a source node in a first security domain; applying, by the first intermediate node, a first data filter to determine that the first data item complies with a data security requirement of the fragmented CDS; transmitting, by the first intermediate node, the first data item to a second intermediate node operating in a second physical device in the first assured pipeline of the fragmented CDS; applying, by the second intermediate node, a second data filter to redundantly determine that the first data item complies with the data security requirement of the fragmented CDS; and transmitting, by the second intermediate node, the first data item to a recipient node in a second security domain via the first assured pipeline.

The method may further include: sanitizing, by a third intermediate node operating in a third physical device in the first assured pipeline of the fragmented CDS, the first data item to mitigate a first malicious attack vector; and transforming, by a fourth intermediate node operating in a fourth physical device in the first assured pipeline of the fragmented CDS, the first data item from a first data type to a second data type, to mitigate a second malicious attack vector.

The method may further include: receiving, by a cross-domain router in the fragmented CDS, multiple status messages from multiple nodes in the fragmented CDS, the status messages indicating respective data filtering capabilities of the nodes in the fragmented CDS; and determining, by the cross-domain router based at least on the status messages, that the first assured pipeline satisfies a minimum security requirement for routing the first data item from the source node in the first security domain to the recipient node in the second security domain.

The method may further include: enforcing attribute-based access control for the first data item along the first assured pipeline.

The method may further include: enforcing a one-way data flow policy along the first assured pipeline.

The method may further include: routing a second data item from the source node in the first security domain to the recipient node in the second security domain, via a second assured pipeline in the fractionated CDS, wherein routing the second data item comprises applying, by a third intermediate node operating in a third physical device in the second assured pipeline that is different from any node in the first assured pipeline, the first data filter to determine that the second data item complies with the data security requirement of the fragmented CDS.

Transmitting the first data item to the second intermediate node in the first assured pipeline of the fragmented CDS may include transmitting the first data item to a group of nodes in the fractionated CDS that are neighbors to a transmitting node.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

The following table of contents is provided for the reader's convenience and is not intended to define the limits of the disclosure.

Figure 1:
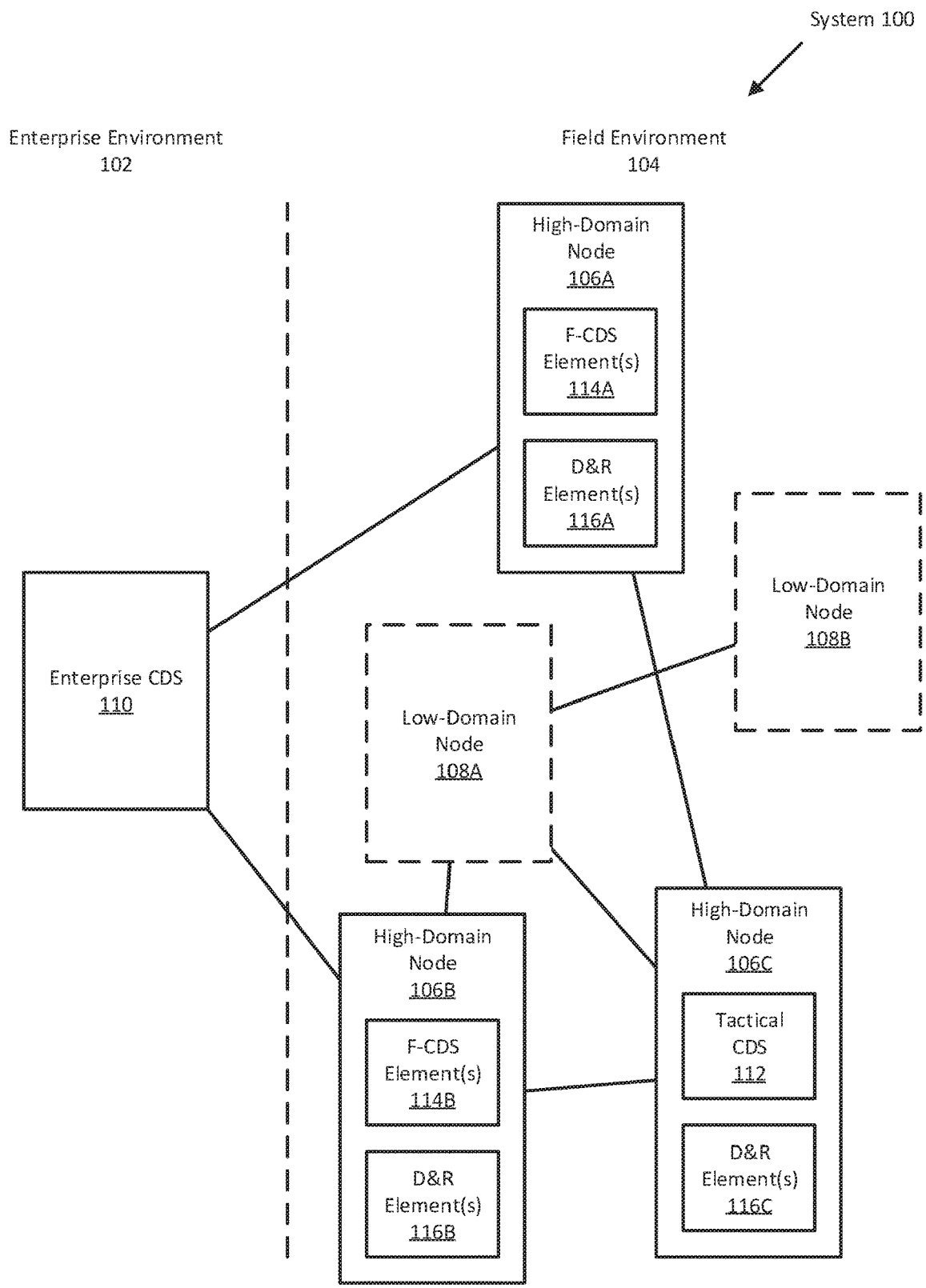
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the system 100 includes an enterprise environment 102 and a field environment 104. The field environment 104 includes nodes (e.g., mobile devices) operating in different security domains—in this example, high-domain nodes 106A, 106B, and 106C, and low-domain nodes 108A, 108B. For example, the nodes may be associated with different entities (e.g., allied military forces) operating in different security domains. Cross-domain communication may require access to some kind of CDS. A typical solution may require accessing an enterprise CDS 110 in the enterprise environment 102 or a tactical CDS 112 in the field environment 104. However, a connection to the enterprise CDS 110 or tactical CDS 112 may be disrupted or otherwise unavailable. As illustrated in FIG. 1, two or more nodes (in this example, high-domain nodes 106A and 106B) may operate as F-CDS nodes that each include one or more F-CDS element(s) (in this example, F-CDS element(s) 114A, 114B). Together, the F-CDS elements 114A, 114B form a fragmented CDS that is capable of providing secure, timely cross-domain communication, even if an enterprise CDS 110 and/or tactical CDS 112 is not available. In general, an F-CDS element refers to hardware and/or software configured to execute one or more of the components of CDS functionality that are distributed across the nodes in the F-CDS. Some examples of F-CDS elements are described in further detail below.

In an embodiment, one or more nodes in the system 100 include hardware and/or software configured to perform cross-domain discovery and/or routing (collectively, D&R elements), as described herein. In the example of FIG. 1, high-domain nodes 106A, 106B, 106C respectively each include one or more D&R element(s) 116A, 116B, 116C. Some nodes may include both a D&R element and an F-CDS element (e.g., high-domain nodes 106A and 106B), D&R without F-CDS (e.g., high-domain node 106C), or F-CDS without D&R (not shown). The F-CDS element(s) and/or D&R element(s) executed by a particular node may depend, for example, on the resources and/or certification levels needed to execute each element.

In an embodiment, D&R elements form an information sharing overlay. D&R elements may use existing secure network connections when available, while also being capable of securely sharing content across a multi-hop untrusted network (e.g., in FIG. 1, from a high-domain node across one or more low-domain nodes). Cross-domain D&R may allow for automated discovery of reachable CDS's (e.g., an E-CDS, a T-CDS, and/or F-CDS nodes), so that information can be securely transmitted across security domain boundaries. For example, in cases where mobile devices lack on-board CDS capability but have robust connectivity (e.g., via satellite), D&R elements may allow those devices to connect to an enterprise CDS 110, tactical CDS 112, and/or F-CDS, to execute CDS operations that the mobile device may lack the resources to perform itself. D&R elements may thus provide access to a self-forming, distributed, cross-domain information sharing substrate that transmits data to CDS devices, wherever they are located. D&R elements may be configured to select particular CDS devices for routing. One or more CDS devices may be selected, for example, based on filtering capabilities and available communication paths. In some embodiments, cross-domain D&R uses a publish/subscribe data transfer substrate as described herein.

In an embodiment, cross-domain D&R provides resilient information sharing in dynamic network environments, by automatically identifying available CDS capabilities, including E-CDS, T-CDS, and F-CDS. Cross-domain D&R may use Robust Information Gateway (RIG) technology developed under the Defense Advanced Research Projects Agency (DARPA) Dynamic Network Adaptation for Mission Optimization (DyNAMO) program. Specifically, one or more D&R elements 116A, 116B may include a discovery state handler that leverages a RIG publish-subscribe interface to exchange state (e.g., via discovery messages, which may also be referred to as status messages) relevant to cross-domain information sharing across networks.

In an embodiment, D&R includes intra-domain discovery and/or inter-domain discovery. With intra-domain discovery, nodes share state within a security domain, with cross-domain links being manually established under tight control. Inter-domain discovery may allow for increased flexibility and automation, at the cost of introducing higher risk. State shared between discovery state handlers in different domains may include key data items that are sensitive and need themselves to be protected and communicated via CDS.

In an embodiment, discovery messages announce filtering capabilities available through reachable CDS's in respective domains. Filtering capabilities may be expressed in terms of filtering operations that can be performed on specific data types. For example, D&R element 116A in high-domain node 106A may publish a status message in the form <filterCapability, HighDomain, VMF>, indicating that high-domain node 106A can filter information of type VMF to the high domain. High-domain node 106A may be able to do so via an F-CDS element 114A in the high-domain node itself, via an enterprise CDS 110, and/or via a tactical CDS 112. For security purposes, the status message may deliberately omit the exact endpoints. A status message having this form, or a similar form, may allow a routing algorithm to perform a coarse-grained reachability analysis between domains.

In an embodiment, discovery messages announce information about specific filter implementations, enabling a routing algorithm to establish the "independence" property of the RAIN principle. For example, D&R element 116A in high-domain node 106A may publish a status message in the form <filterImplementation, HighDomain, VMF, Daffodil_2.2.0>. To help protect sensitive implementation details, discovery messages may use a one-way functional mapping scheme that maps specific implementations into anonymous groups (e.g., "filter_implementation_group1"). This mapping scheme may allow comparison across multiple filter implementations without disclosing unnecessary implementation details, e.g., specific version numbers.

In an embodiment, discovery messages announce resource utilization metrics. The resource utilization metrics may be remotely collected from one or more CDS's (e.g., via a Simple Network Management Protocol (SNMP) CDS Management Information Base) or locally generated (e.g., by gaining visibility into RIG's queue management state used for content dissemination).

In an embodiment, a discovery state handler in a D&R node (i.e., a node that includes one or more D&R elements) is configured to publish its local state and receive state from other D&R nodes. Based on the available state information, the D&R node may be configured to form a local view of available cross-domain sharing capabilities. It may not be necessary for all nodes to have access to information about all domains. In cases where information about target domains can be shared, a local node may be configured to make an informed decision about where to route information next. In cases where no information is available, a local node may flood content to neighboring D&R instances (i.e., transmit the content to a group of neighboring nodes, rather than to a single node), subject to available network bandwidths.

In an embodiment, cross-domain D&R uses a routing protocol that moves information to one or more appropriate CDS's (e.g., E-CDS, T-CDS, and/or F-CDS), in order to move the content across security domain boundaries (e.g., based on data subscriptions in a publish-subscribe model). The routing protocol may identify, at each node (e.g., based on discovery/status messages, described above), a "best" next node (if discernible) to receive the information. Determining a "best" next node may be based on one or more constraints. Cross-domain D&R may prioritize nodes that have a diverse filtering capability compared to the filtering (if any) that has already been performed on the information. To prioritize diverse filtering, routing may rely on provenance information about what CDS functionality has already been performed. For example, routing may inspect proofs generated by verifiable computation (VC) filters, discussed in further detail below. For non-VC filters, routing may inspect signed hashes generated via a public key infrastructure (PKI) or obtain provenance information in some other way. In cases where multiple routing options exist, cross-domain D&R may perform load balancing, based on nodes' respective performance metrics.

In some cases, the release of information about CDS filtering capabilities may be restricted. In such cases, cross-domain D&R may choose between different replication strategies based on the priority of the information (e.g., priority in the context of a mission). The replication strategies may differ, for example, by the number of next-hop nodes that the information is forwarded to. For information that needs to be received within a high likelihood and small latency, a replication strategy may flood the information out to as many nodes as possible, increasing the chances that at least one node contains the information together with enough independent and diverse filter checks to enable the receiver to establish adherence to the RAIN principle.

In an embodiment, cross-domain data transmission uses attribute-based encryption (ABE). ABE does not require end-to-end sessions or bi-directional exchange of information, making it better suited for cross-domain communication where (a) sessions may be difficult to establish and secure, and (b) bi-directional data exchanges may introduce security risks. In addition, cross-domain data transmission may use verifiable computation (VC) to express F-CDS filter functions as cryptographic circuits. Expressing F-CDS filter functions as cryptographic circuits may allow for provable provenance chains, expressing the filtering computation performed on the information as it travels between multiple F-CDS elements over an untrusted network substrate. ABE and VC are discussed in further detail below.

In some embodiments, nodes in another security domain (e.g., low-domain nodes 108A and 108B) may also include F-CDS and/or cross-domain D&R elements, to support secure cross-domain communication to and/or from that security domain. F-CDS and/or cross-domain D&R may be used in one or more of: intra-domain communication (high-to-high and/or low-to-low); high-to-low communication; and/or low-to-high communication. The specific configuration of nodes in FIG. 1 is provided as an example only and should not be construed as limiting one or more embodiments.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
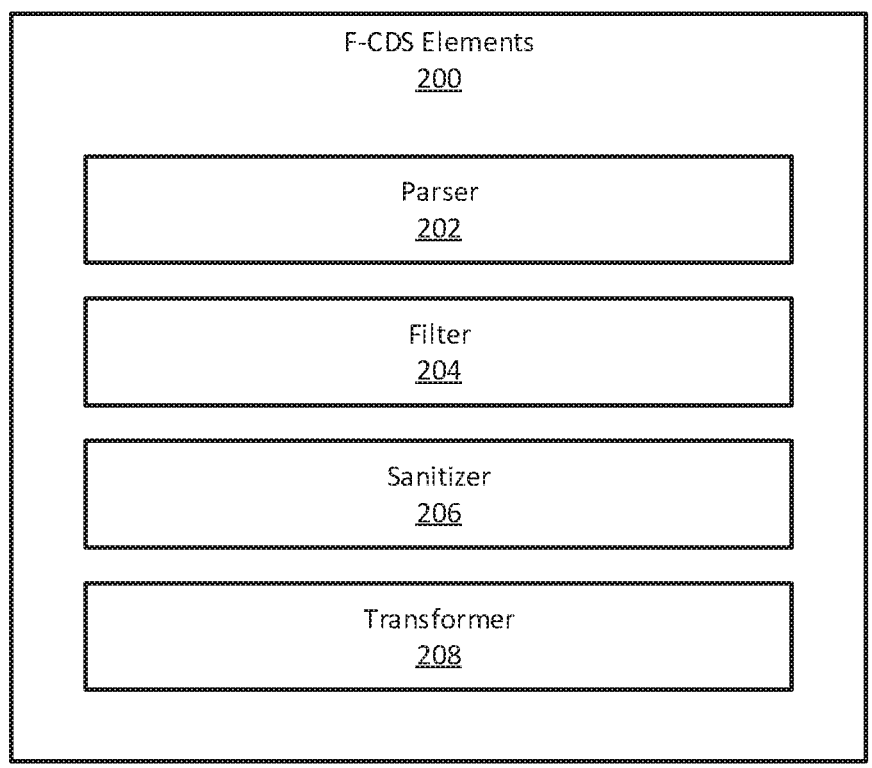
FIG. 2 is a block diagram illustrating an example of F-CDS elements according to an embodiment.

FIG. 2 is a block diagram illustrating an example of F-CDS elements 200 according to an embodiment. A particular node may include one or more of the F-CDS elements 200 illustrated in FIG. 2, and/or one or more other F-CDS elements not illustrated in FIG. 2. The F-CDS elements 200 illustrated in FIG. 2 are provided as examples only and should not be construed as limiting one or more embodiments.

In an embodiment, the F-CDS elements 200 include a parser 202. A parser 202 refers to hardware and/or software configured to parse a data item, to determine whether the data item conforms to an expected data format. For example, if the data item is a file with a .xml extension, the parser 202 may parse the data item to determine whether it contains valid extensible markup language (XML). As another example, if the data item is a file with an extension typically associated with image files, the parser 202 may parse the data item to determine whether it contains valid image data.

In an embodiment, the F-CDS elements 200 include a filter 204. A filter 204 refers to hardware and/or software configured to determine whether a data item includes a known set of malicious data (e.g., malicious code). For example, a filter 204 may inspect a data item for data that is known to be associated with a particular form of malware. Data items containing malicious data are "filtered out," i.e., not blocked and prevented from continuing through the assured pipeline.

In an embodiment, the F-CDS elements 200 include a sanitizer 206. A sanitizer 206 refers to hardware and/or software configured to remove or modify data in a data item, to mitigate a potential malicious attack vector. For example, a sanitizer 206 may be configured to remove metadata and other non-textual data from a Microsoft Word® document, such as macros, tracked changes history, author information, etc. As another example, a sanitizer 206 may be configured to change pixel colors in an image, without changing the overall structure of the pixels in the image.

In an embodiment, the F-CDS elements 200 include a transformer 208. A transformer 208 refers to hardware and/or software configured to modify data within a data item and/or change the format of data within a data item, to mitigate a potential malicious attack vector. For example, if a data item is a Portable Document Format (PDF) file that includes optical character recognition (OCR) and/or other metadata, a transformer 208 may "flatten" the PDF (e.g., by passing the PDF through a virtual printer) into one or more image files without the OCR and/or other metadata. As another example, if a data item is a Portable Network Graphics (PNG) image file, a transformer 208 may convert the data item to a Joint Photographic Experts Group (JPEG) file. As another example, if the data item includes numerical data, a transformer 208 may replace some numbers (e.g., decimal places to a non-essential degree of precision) with other numbers, and/or scrub sensitive data (e.g., removing the first N digits from a social security number or other personally identifiable information). In general, a transformer 208 mitigates a malicious attack vector based on an expectation that an unknown malicious attack is unlikely to survive the transformation operation.

In an embodiment, some F-CDS elements 200 are present in all F-CDS nodes, while other F-CDS elements 200 are present in only a subset of F-CDS nodes. For example, one node may include a filter 204 while another node includes a sanitizer 206. Cross-domain D&R may be configured to ensure that an assured pipeline includes a minimum set of F-CDS elements 200. For example, an assured pipeline may require at least two independent, redundant filters 204.

In an embodiment, F-CDS elements in an assured pipeline are required to satisfy the RAIN principle: redundant, always invoked, independent implementations, and non-bypassable. "Redundant" means that a particular category of security-related F-CDS element 200 is invoked at least twice (e.g., two filters 204 applied to the same data item). "Always invoked" means that a security-related F-CDS element 200 is always executed as part of transmitting a data item (e.g., two or more filters 204 are always applied to each data item). "Independent implementations" means that the redundant instances of a particular security-related F-CDS element 200, applied to a particular data item, do not use the same implementation. For example, two filters 204 applied to the same data item should have different implementations, e.g., using different algorithms and/or provided by different vendors. Independent implementations increase the likelihood that a malicious attack designed to bypass one filter will still be caught by another filter. "Non-bypassable" means that security-related F-CDS elements 200 cannot be circumvented. For example, enforcing unidirectional data transmission may help ensure that an assured pipeline cannot be bypassed. In general, satisfying the RAIN principles increases the likelihood that a single node failure will not compromise the entire F-CDS. Cross-domain D&R may be configured to select routing paths through assured pipelines that satisfy the RAIN principle.

Figure 3:
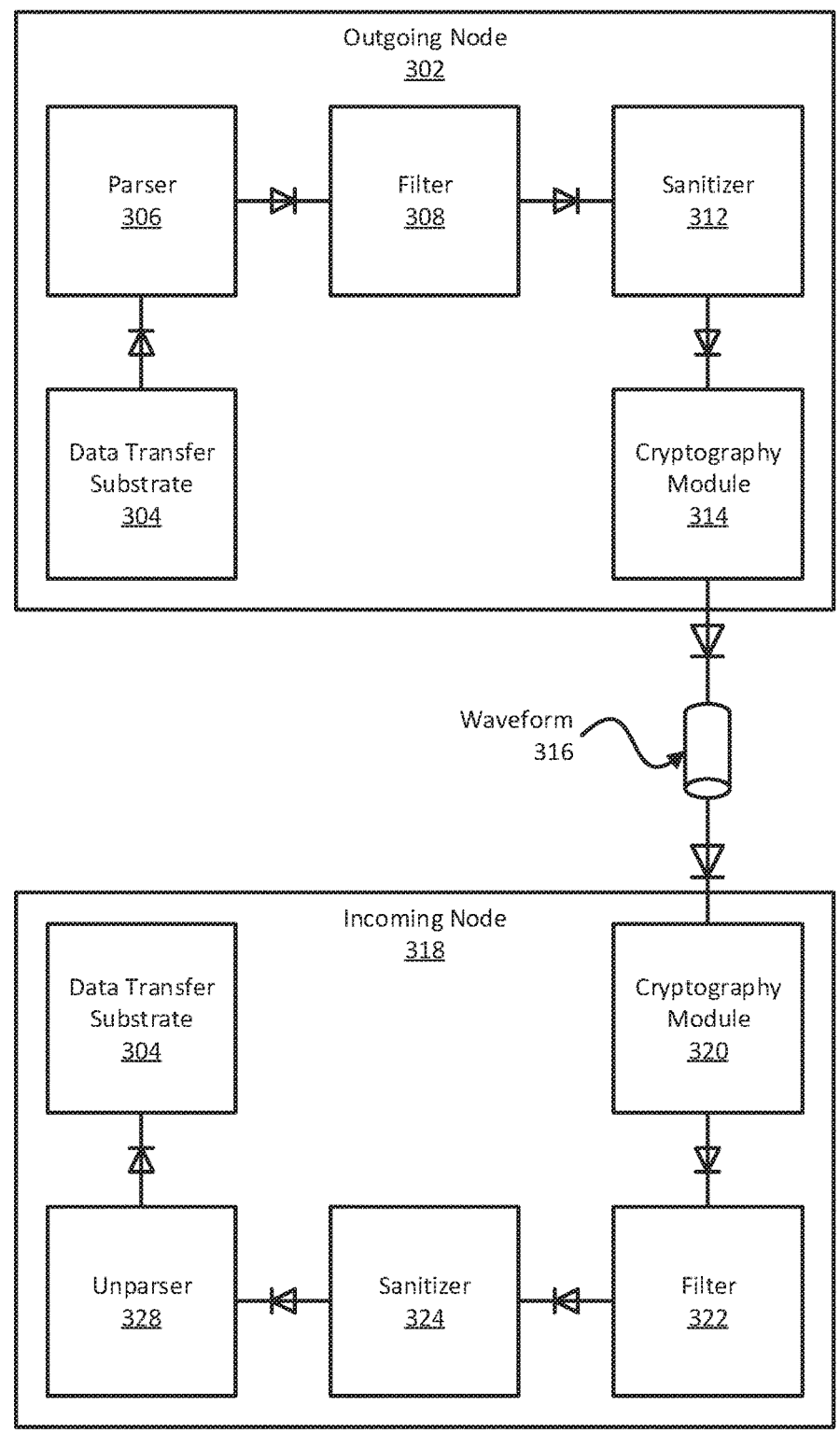
FIG. 3 is a block diagram of an example of nodes in a fragmented cross-domain solution according to an embodiment.

FIG. 3 is a block diagram of an example of nodes in a fragmented cross-domain solution according to an embodiment. Specifically, FIG. 3 illustrates an example of an outgoing node 302 and an incoming node 302, in different security domains. In an embodiment, each node may include more or fewer components than the components illustrated in FIG. 3.

As illustrated in FIG. 3, nodes 302, 318 perform unidirectional exchange of information across a domain boundary, using a pitcher-diode-catcher paradigm (discussed in further detail below). In some embodiments, one or more nodes are configured to be both "pitchers" and "catchers."

In an embodiment, nodes 302, 318 transmit data using a data transfer substrate 304. The data transfer substrate 304 may use a publish-subscribe model. One challenge of sharing information between devices in a timely manner (e.g., at the tactical edge where rapid communication is frequently essential) is managing configurations required to support information exchange. For example, point-to-point connections between clients and servers may be difficult to establish and maintain. Another challenge is encoding and exchanging information across a potentially large and diverse set of wireless protocols (e.g., Wi-Fi, Long-Term Evolution (LTE), Link 16, Common Data Link (CDL), LoRa, etc.), while coping with variability in factors such as network connectivity, latency, and throughput (e.g., in contested areas that are subject to adversarial interference). A publish-subscribe model of data transfer substrate 304 may help mitigate such challenges.

Specifically, in an embodiment, the data transfer substrate 304 is an information-centric distributed publish-subscribe substrate. The data transfer substrate 304 may use, for example, RIG technology mentioned above. However, features described here may apply similarly to technologies other than RIG, and embodiments should not be considered limited to using RIG. In an embodiment, RIG facilitates integration with existing operational sensors and actuators, by providing an application interface component that includes protocol adapters, parsers, and information mappers. Sensors may publish content to their local RIG, and consumers may request information by issuing subscriptions to their local RIG. RIG's information transfer component may disseminate information and subscriptions between the various RIG nodes, performing matching where available, and caching information to overcome network disruptions. A network optimizer (not shown) (e.g., Adaptive Overlay and Routing Technology for Airborne Networks (AORTA) or another kind of network optimizer) may monitor underlying networks on an ongoing basis and unify different waveforms into a consistently addressable overlay network.

In an embodiment, an outgoing node 302 is configured to receive a data item (e.g., via a subscription) from the data transfer substrate 304. The outgoing node 302 may be configured to process the data item using one or more F-CDS elements, such as a parser 306, filter 308, sanitizer 312, and/or transformer (not shown). Parsing, filtering, sanitization, and transformation are described in further detail above. In an embodiment, a filter 308 is encapsulated by a dedicated process. The dedicated process may be, for example, a regular system process or an application container.

In an embodiment, the outgoing node 302 includes a cryptography module 314 configured to secure transmission of data from the outgoing node 302 to the incoming node 318 over a waveform 316. Cross-domain D&R over an F-CDS presents some challenges. In some cases, not all devices through which a data item passes have encrypted physical layer paths between them by default. Therefore, it may not be possible to guarantee the confidentiality and integrity of messages. In addition, tactical devices may fall into the hands of adversaries, providing adversaries with physical control over assets and the ability to tamper directly with the integrity of processing performed on the device. This challenge is particularly important for F-CDS implementations, which distribute functions across multiple devices (e.g., a large set of tactical devices). In general, securing an F-CDS may be complicated by factors including, but not limited to: (1) information-centric data flow is unidirectional instead of the traditional bidirectional end-to-end point-to-point secure channels; (2) the publisher of information in the primary domain may not know who the intended recipients are or what path the information may take, yet must still be able to protect against unauthorized disclosures; and (3) F-CDS elements along the dynamic path must be able to process the data item in order to perform the necessary filtering, sanitization, transformation, etc.

In an embodiment, the cryptography module 314 addresses some or all of the aforementioned concerns by using Attribute-Based Encryption (ABE). The cryptography module 314 may be configured to use an existing operational cryptographic protocol whenever possible. For example, the cryptography module 314 may be configured to delegate encryption to High Assurance Internet Protocol Encryptor (HAIPE) radios or use Transport Layer Security (TLS) in network environments with robust connectivity. However, in some multi-hop paths (e.g., between RIG/AORTA nodes), only some of the network links may support such encryption. The cryptography module 314 may be configured to encrypt the data item itself, using ABE, rather than relying solely on underlying network encryption protocols. ABE-encrypted information can be transmitted over untrusted networks and stored on untrusted devices, thus increasing the storage and dissemination capacity of an F-CDS system. ABE is a one-to-many encryption technology that is well-suited for protecting the confidentiality and integrity of data in a unidirectional, dynamic, and possibly offline (with respect to the enterprise environment) setting.

As one example, a Cursor on Target (CoT) message at an outgoing node 302 may be encrypted with an expressive policy (e.g., "US.AF.COMMANDER" or "US.AF.M1.CDS," where the namespace "US.AF" refers to the U.S. Air Force authority and "M1" is a mission name). The policy indicates that only users or devices with attribute keys that match this policy will be able to decrypt the data and access its contents (e.g., plaintext content). Since E-CDS, T-CDS, and/or F-CDS will have a key corresponding to the attribute (in this example, the attribute string "US.AF.M1.CDS"), they will be able to decrypt and process the contents of the CoT message as it is being routed. Similarly, any entity with the attribute "COMMANDER" will be able to access the message contents. The ABE-encrypted CoT ciphertext is self-enforcing, in that the security policy is self-enforced by the cryptography. Thus, in this example, the incoming node 318 can store and forward the content without the risk of unauthorized disclosure. In addition, the assured pipeline does not depend on any online mediation service for authorization.

In general, ABE may provide several beneficial features for F-CDS:

(1) ABE includes role and content-based cryptographic and granular access control. In role-based access control, attributes describe roles. In content-based access control, attributes describe the content. This feature allows for granular policies and high flexibility during deployment.

(2) ABE includes self-enforced access control. Self-enforcement by the cryptography enables offline operations where online authorization services and wide-area connectivity may not be available.

(3) ABE protects content and metadata. Both the content itself and the attributes with which the content is encrypted (metadata) can be kept confidential.

(4) ABE includes collusion resistance and resilience. Principals cannot collude without combining their keys. Compromise of any number of attribute keys does not further compromise the system.

(5) ABE includes autonomous authority operations. Each enclave authority has full control over its identity, attribute, and key management services, with no requirement for centralized trust. Autonomous authority operations may be important, for example, in multi-authority (e.g., coalition) environments with varying levels of trust among participants.

(6) ABE is practical and useable. Highly efficient cryptographic algorithms have been demonstrated on desktop and mobile platforms, in some cases taking about 30 milliseconds to encrypt/decrypt Ciphertext-Policy Attribute-Based Encryption (CP-ABE) ciphertext for policies referencing twenty attributes.

In a contested and dynamic environment, devices using CDS's and their assured pipelines may become compromised. Devices may need to verify that received content has been correctly filtered, sanitized, etc., before allowing the content to cross a domain boundary. As one example, a simplified scenario includes three nodes: a high-side node H, a conventional CDS (e.g., an E-CDS), and a low-side node L. To send a piece of data x from L to H, L sends x to the CDS over a secure point-to-point channel. The CDS processes x to produce the processed output $y=f(x)$, and sends y to H over a secure point-to-point channel. H accepts y, due to a trust relationship between H and the CDS. However, in some cases, that level of trust may not be assured. For example, H may not trust where the data was sourced from. The computation may have been performed by a semi-trusted or potentially untrusted third party.

In an embodiment, to help mitigate the aforementioned concerns, the cryptography module 314 is configured to generate units of verifiable computation (VC). The cryptography module 314 may be configured to express filter functions as cryptographic circuits, enabling recipients of information to detect whether the filter was bypassed or corrupted. Using these techniques, recipients may be able to track which filters have been executed on any piece of information. For example, a high-side cryptography module may be able to provably verify that a low-side assured pipeline filtered the data in a certain way. Proof of filtering may be sent with the data item, and may be small (e.g., about 280 bytes) and fast to verify on the high side, before the data is ingested and processed further.

In an embodiment, VC allows a recipient (e.g., high-side node H in the example above) to trust the received data y, because the recipient can verify that a computation f(x) was performed on the data, without having to trust where the information was sourced from, etc. Specifically, a third party with an input x sends output f(x) to H, along with a proof p that y=f(x). The computation f is public within the security domains of interest. The input x is not known to H prior to the interaction, and may be any input from an accepted input domain. H may be configured to verify that y=f(x) while incurring a small verification cost, compared to having to locally recompute f(x) from scratch. In addition, the proof p may be small, compared to the size of f. Using VC may thus provide increased assurance and flexibility in a tactical and contested environment.

In an embodiment, a VC cryptographic scheme is instantiated using succinct non-interactive arguments or knowledge ("SNARKs"). Using SNARKs, a prover who has a public output x and a private input u can compute y=f(x,u) and a proof p that proves the correctness of f. The prover sends (y,p) to the verifier. Given (x,y,p), the verifier outputs "true," 1, or some other affirmative value if and only if y=f(x,u). A trusted setup phase (preprocessing) may be required for each functionality circuit. The trusted setup produces a proving key and a verification key for functionality f for the prover and the verifier, respectively. Keys may be reused indefinitely for the same computation. Zero knowledge SNARKs (zk-SNARKs) may allow for proofs on the order of a couple hundred bytes and verification times on the order of tens of milliseconds.

In an embodiment, a SNARK construction models computation as arithmetic circuits over a finite field. Computations are represented as a circuit that includes a set of polynomials over a finite field (corresponding to addition, multiplication, and constant gates over field elements). Programs may be compiled down from higher-level languages into circuits.

Continuing with discussion of FIG. 3, the incoming node 318 may also include a cryptography module 320, a filter 322, and/or a sanitizer 324. In addition, the incoming node 318 may include an unparser 328 (e.g., a Data Format Description Language (DFDL) unparser) configured to unparse the data item into a data stream before sharing (e.g., publishing) the data item to the data transfer substrate 304.

In an embodiment, nodes in an assured pipeline provide fail-close semantics, making the assured pipeline very resilient against privilege escalation attacks. In the example of FIG. 3, errors during parsing by the parser 306 (e.g., using Data Format Description Language (DFDL) parsing) or attacks that crash a filter 308, 322 (e.g., an XPATH filter) may immediately stop the traffic, preventing transfer of potentially malicious data across domains. An integrity attack on the filter 308 in the outgoing node 302 may allow an adversary to get malicious data past that filter 308. However, the redundant and diverse filter 322 in the incoming node 318 will likely catch that malicious data and reject it. An adversary wanting to overcome this filtering design would need to find exploits against two filter implementations (i.e., filters 308, 322), which would be considerably harder than finding an exploit against just one of the filters 308, 322. Nodes in an assured pipeline may also be configured to perform data sanitization and/or transformation, e.g., by down-sampling, removing metadata (e.g., metadata associated with imagery data), performing datatype conversions between various different data formats to neuter threats (e.g., by converting PNG to JPEG), etc.

Figure 4:
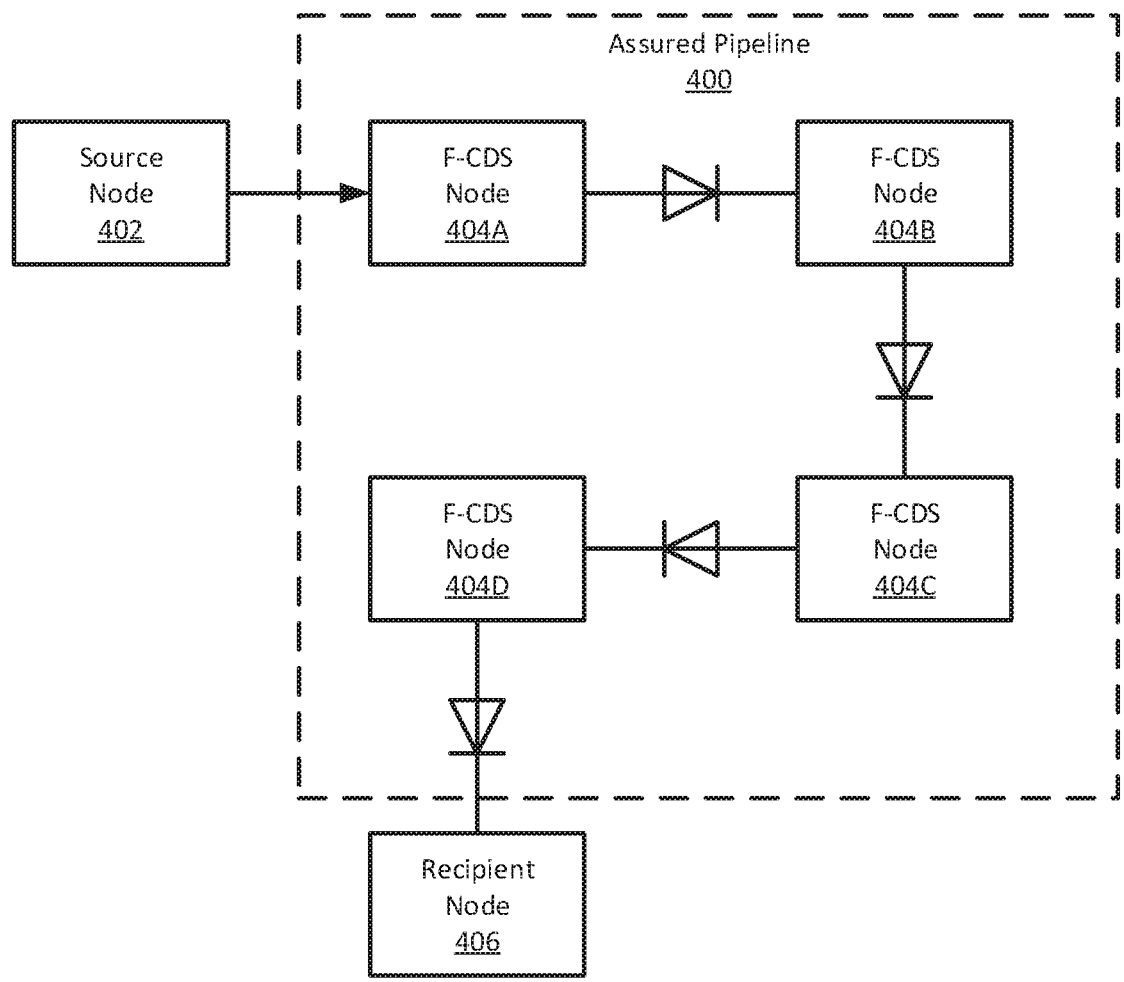
FIG. 4 is a block diagram of an example of an assured pipeline according to an embodiment.

FIG. 4 is a block diagram that illustrates an example of an assured pipeline 400 according to an embodiment. The specific configuration of the assured pipeline 400 is provided as an example only and should not be construed as limiting one or more embodiments.

In an embodiment, an assured pipeline 400 provides the main filtering, auditing, sanitization, and/or transformation processing associated with F-CDS's. One challenge typically associated with realizing CDS's with devices in the field (e.g., mobile devices) is the need for strong isolation across multiple domains hosted on a single device. The resulting delays in certification frequently lead to circular situations in which the specific device used for certification is no longer available once approvals arrive, yet switching to a new device requires further rounds of certification. An F-CDS helps overcome this problem by distributing functionality across multiple devices, avoiding the need to host multiple security domains on a single device. In the example of FIG. 4, CDS functionality is distributed across multiple F-CDS nodes 404A-D, providing the assured pipeline 400 from a source node 402 to a recipient node 406. Spreading CDS functionality across multiple devices yields strong isolation and domain separation compared to typical CDS approaches (e.g., hypervisor-based multi-domain mobile devices). Devices in the assured pipeline 400 may use unclassified cryptographic algorithms, though some data transferred through the assured pipeline 400 may be classified or otherwise sensitive. RIG (discussed above) and/or the ROGER (Robust Operational Gateways Enabling Reach-forward/Reach-back) gateway may provide a foundation for assured pipeline integration. As illustrated in FIG. 4, communication between nodes may use a pitcher-diode-catcher paradigm, in which the diode ensures that communication between one device (the "pitcher") to another device (the "catcher") flows only in one direction. Diodes may provide strong guarantees on the unidirectionality of flows. For example, high-side processing of sensor data may be enabled without any disclosure to low-side sensor components. Many different approaches may be used to enforce unidirectional flow through data diodes. Directionality of information flow may be achieved through software modifications (e.g. sliced executables, where sending and receiving executable code is separated between nodes), policy enforcement (e.g., SELinux flow enforcement), and/or hardware configurations (e.g., transmit-only radios). At the hardware layer, many different data transfer protocols (e.g., Uniform Serial Bus (USB)) exist. Some implementations may leverage physical properties (e.g., propagation of light) to ensure unidirectionality, while other approaches may leverage low-level hardware solutions (e.g., Field Programmable Gate Arrays (FPGA)). Software-based solutions may include, for example, SELinux-type enforcement and the use of Inter-Process Communication (IPC) between processes, together with system call filtering to prevent covert channels by virtue of interrogating queue sizes.

In an embodiment, the assured pipeline 400 uses platform-specific security controls to isolate different filters from each other, so that corruption of a single filter does not automatically lead to privilege in other filters or the base platform. For example, nodes in the assured pipeline 400 may combine Discretionary Access Controls (DAC) (e.g., user ownership permission rights) with Mandatory Access Controls (e.g., SELinux), to achieve robust, fine-grained isolation. In addition, as discussed above, nodes in the assured pipeline 400 may use diodes to enforce a one-way communication flow between the various components (e.g., components within each node and/or between nodes).

Figure 5A:
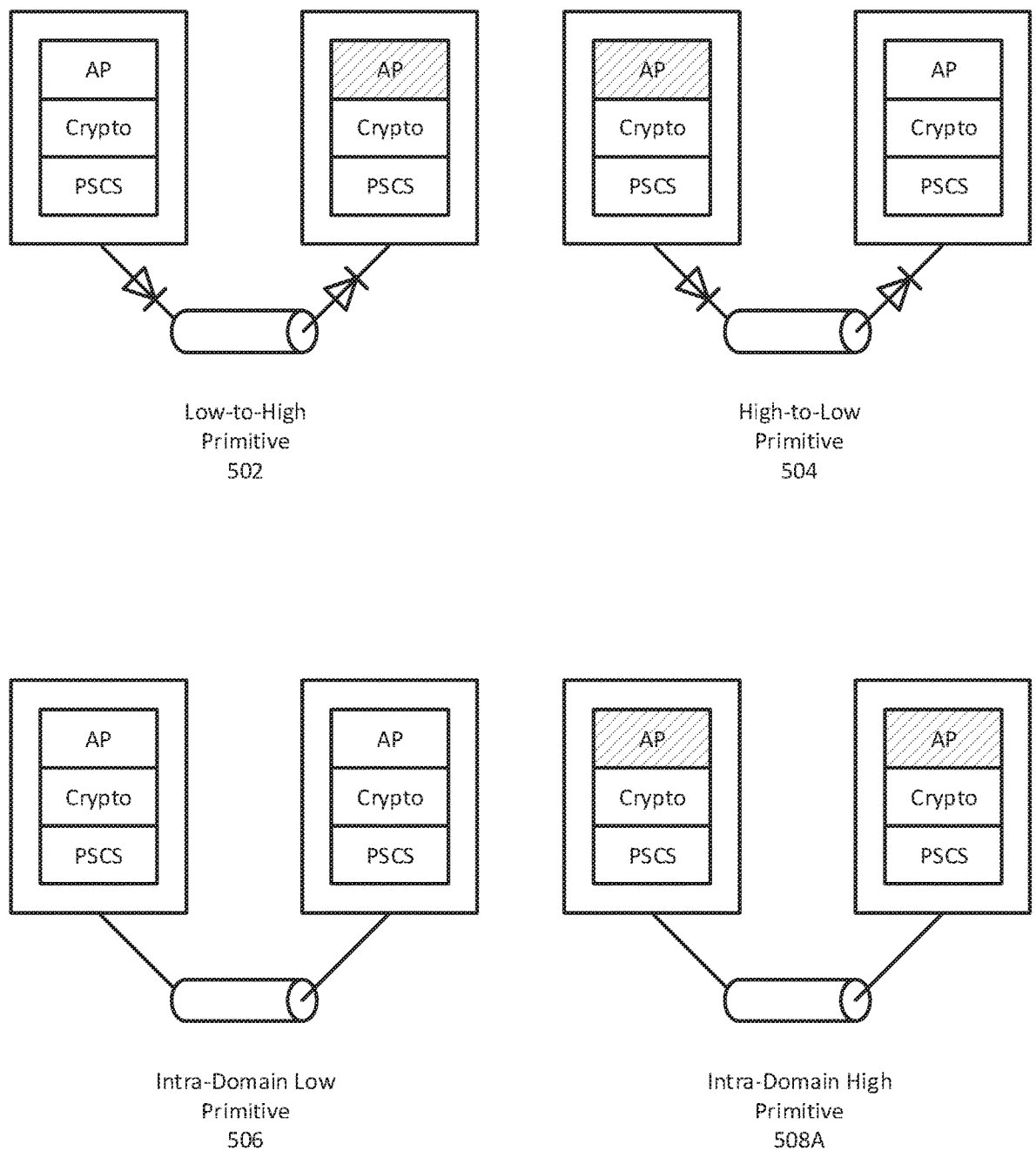
FIGS. 5A-5B are block diagrams of examples of deployment primitives according to an embodiment.
Figure 5B:
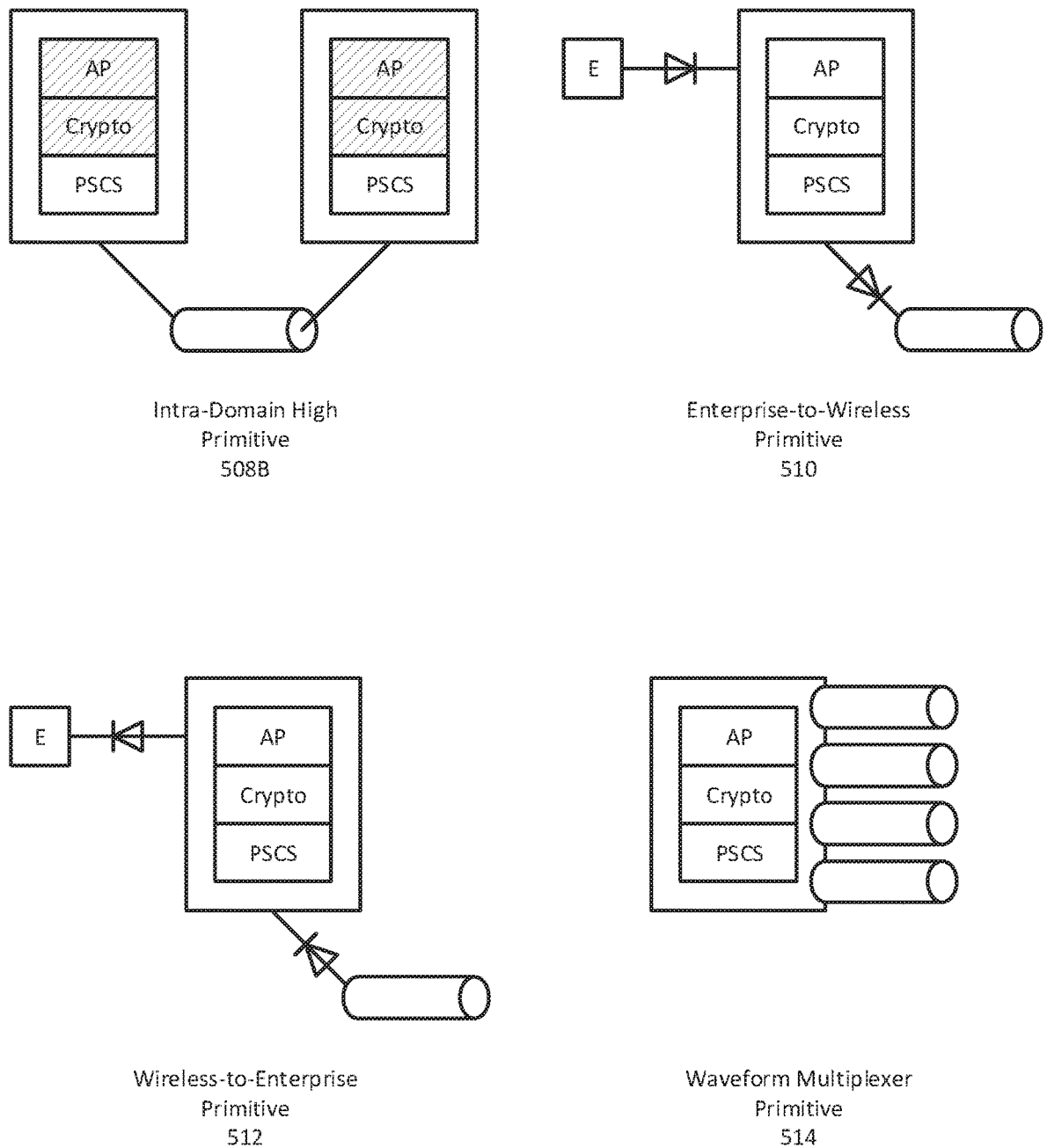

In an embodiment, an assured pipeline may be constructed (e.g., by cross-domain D&R) and/or conceptualized as a set of deployment primitives. FIGS. 5A-5B are block diagrams of examples of deployment primitives according to an embodiment. In these example illustrations, shaded components need to be controlled at a high classification level, while non-shaded components are allowed to be controlled at a low classification level. Deployment primitives may support cross-domain sharing (e.g., low-to-high primitive 502 and high-to-low primitive 504), intra-domain sharing (e.g., intra-domain low primitive 506, intra-domain high primitive 508A, and intra-domain high primitive 508B), and various network connectivity regimes (e.g., enterprise-to-wireless primitive 510, wireless-to-enterprise primitive 512, and waveform multiplexer 514).

Figure 6:
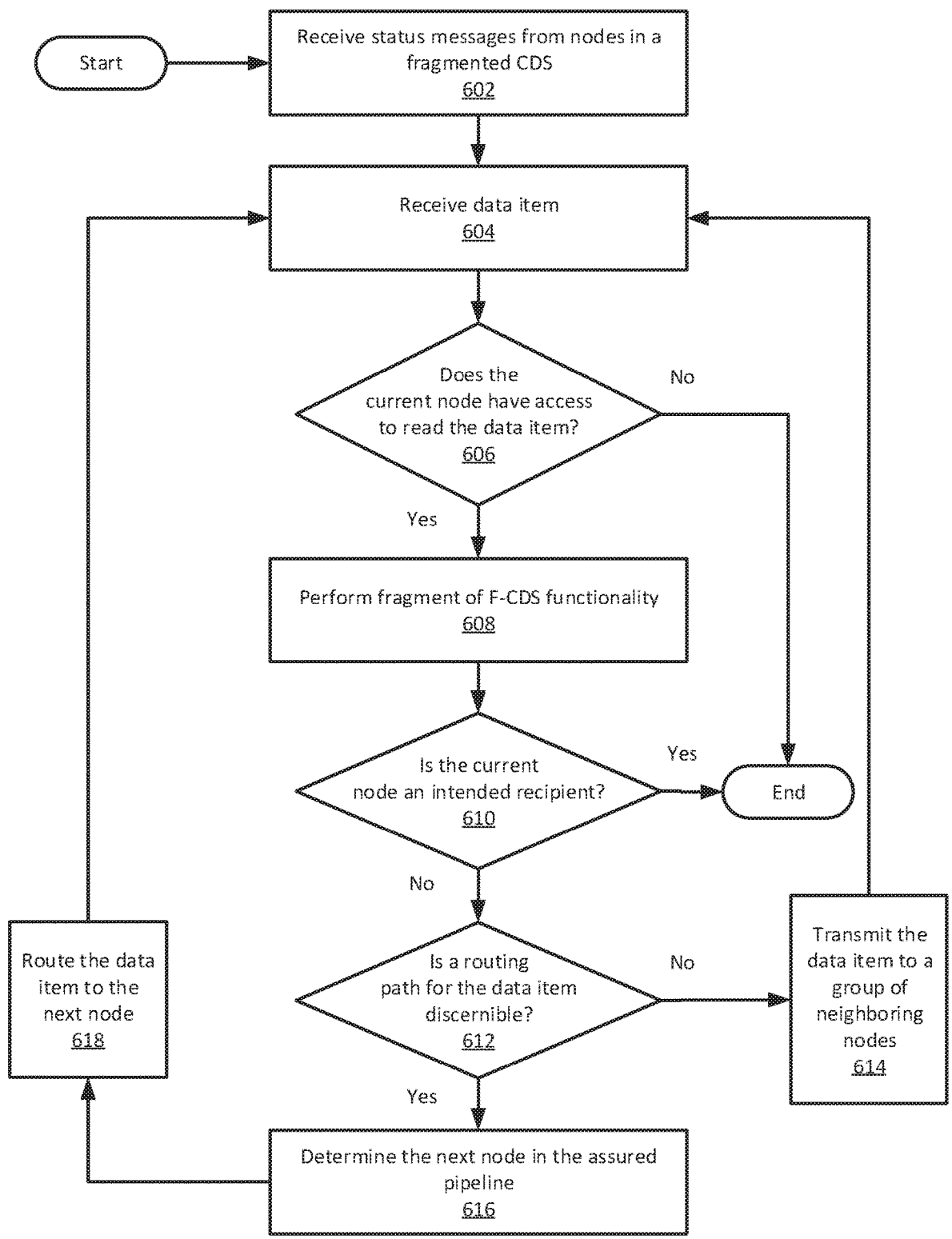
FIG. 6 is a flow diagram of an example of operations for cross-domain routing using a fragmented cross-domain solution according to an embodiment.

FIG. 6 is a flow diagram of an example of operations for cross-domain routing using a fragmented cross-domain solution according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a node receives status messages from other nodes in the F-CDS (Operation 602). A node that receives status messages may also be an F-CDS node. Alternatively, a node that receives status messages may be a D&R node without including any F-CDS elements. Nodes in an F-CDS may be configured to share status messages using a data transfer substrate, e.g., a publish-subscribe substrate as described herein. The status messages may include information about each node, such as the type of node (e.g., device type), location, F-CDS functions supported (e.g., information about supported filters), and/or other information about the node.

In an embodiment, a node receives a data item to be routed from one security domain to another security domain (Operation 604). The node that receives the data item may be the same node that receives status messages (as described with respect to Operation 602) or another node. The node that receives the data item may determine whether it has access to read the data item (Operation 606). If the current node does not have access to read the data item, then the currently node does not process the data item any further. Alternatively, in some embodiments, the current node may forward the data item to other nodes that may have access to read the data item.

In an embodiment, if the current node has access to read the data item, then the current node executes one or more fragments of F-CDS functionality (Operation 608) on the data item. For example, the current node may parse the data item, apply a filter, sanitize, and/or transform the data item.

In an embodiment, the current node determines whether it is an intended recipient of the data item (Operation 610). If the current node is not an intended recipient, then the current node may take steps to continue routing the data item through the assured pipeline. In some embodiment, the specific path that an assured pipeline follows is not discernible. For example, statuses of other nodes in the F-CDS may not be available. The current node may determine whether a routing path for the data item is discernible (Operation 612). If a routing path is not discernible, then the current node may transmit the data item to a group of neighboring nodes (Operation 614). If a routing path for the data item is discernible, then the current node may determine the "best" next node in the assured pipeline (Operation 616). The "best" next node in the assured pipeline may be based, for example, on status messages received as described above. The current node may then route the data item to the next node in the assured pipeline (Operation 618).

In an embodiment, another node receives the data item (Operation 604) and the data item continues to be routed through the assured pipeline until it reaches one or more intended recipients.

As discussed herein, supporting dynamic cross-domain information sharing requires identifying reachable CDS's (which may include traditional CDS's as well as F-CDS elements), together with their filtering capabilities and resource statuses. Once CDS's are discovered, cross-domain D&R may compute where to send information so that it can successfully traverse domain boundaries and reach the intended consumer(s). Cross-domain D&R may compute a path through one or more assured pipelines (a) for which the RAIN principle holds, and (b) that is/are optimized for latency, throughput, resiliency to network dropout, and/or one or more other factors. Cross-domain D&R may continuously determine the best available path for moving information across domains while maintaining stringent filtering requirements.

Figure 7:
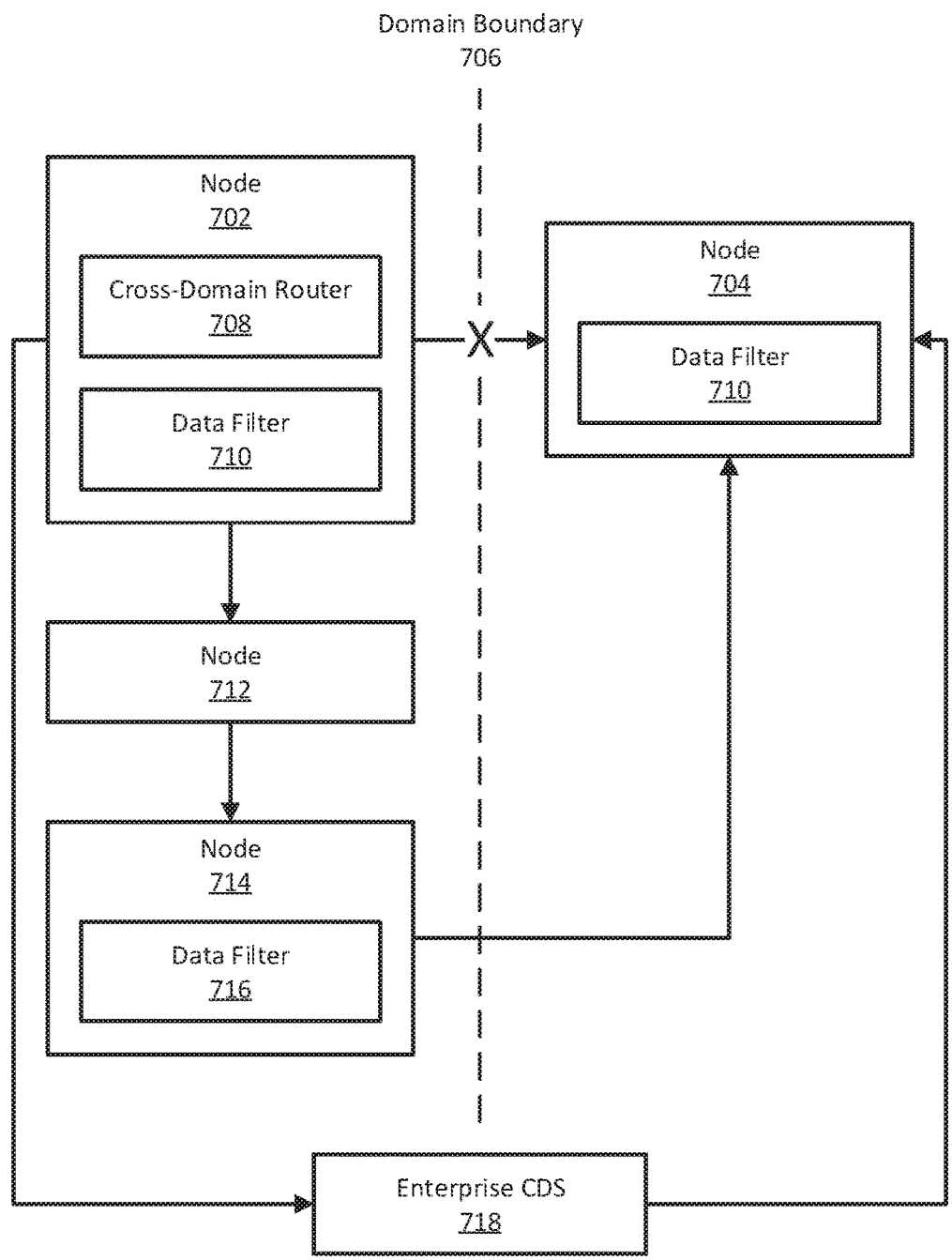
FIG. 7 is a block diagram of an example of cross-domain routing using a fragmented cross-domain solution according to an embodiment.

As one example, FIG. 7 is a block diagram of an example of cross-domain routing using a fragmented cross-domain solution according to an embodiment. As shown in FIG. 7, nodes 702 and 704 are in different security domains, separate by a domain boundary 706. Node 702 cannot communicate directly with node 702, because the two nodes use the same data filter 710 (for example, the data filter 710 may be a particular PNG filter). Using the same data filter 710 twice would violate the RAIN principle. A cross-domain router 708 in node 702 may be configured to determine acceptable routing paths, for example, based on status messages from the nodes in the system. Instead of transmitting a data item directly from node 702 to node 704, the cross-domain router 708 may route the data item via an enterprise CDS 718, if available, and/or via an assured pipeline through nodes 712 and 714. Node 714 includes a data filter 716 that is different from the data filter 710 in node 704 (i.e., an independent, redundant implementation), thus satisfying the RAIN principle. The cross-domain router 708 may be configured to operate both in cases where status messages are allowed (enabling target-specific routing) and cases where status messaging is not possible (in which case the cross-domain router 708 may instead transmit the data item to a group of neighboring nodes). The cross-domain router 708 may be configured to take into account processing capacities across devices and information needs present across multiple domains. Cross-domain routing may use SPARQL query language, XQUERY, and/or another language or combination thereof to express and evaluate such capacities and/or needs.

Figure 8A:
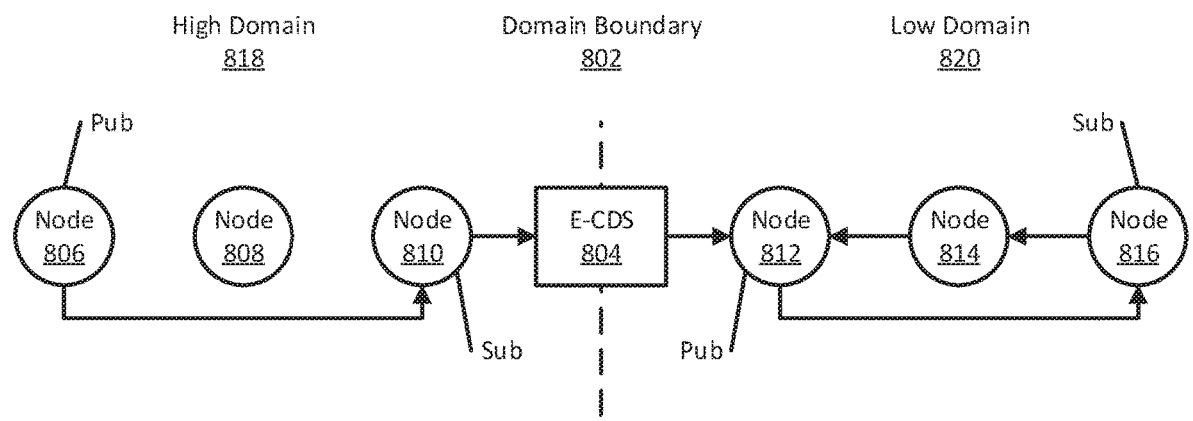
FIGS. 8A-8B are block diagrams of examples of cross-domain routing according to an embodiment.
Figure 8B:
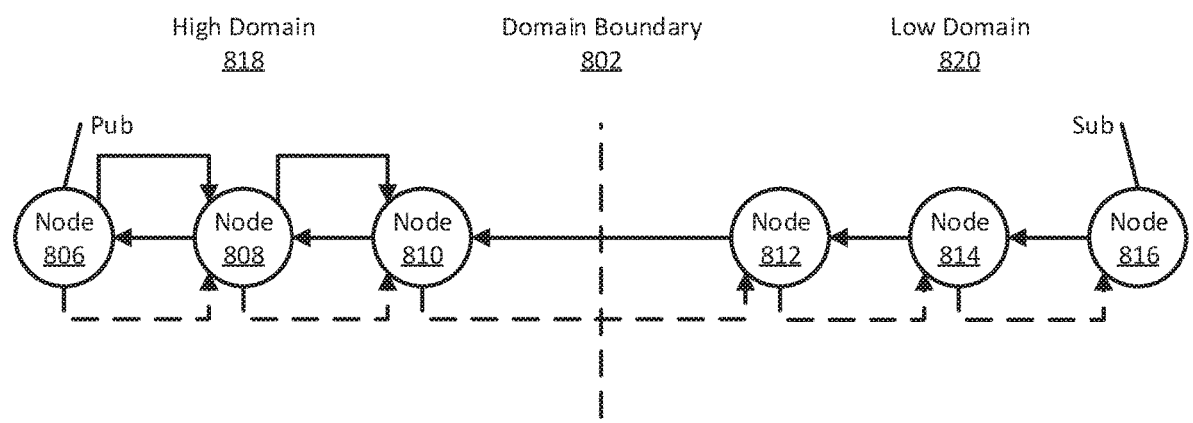

FIGS. 8A-8B are block diagrams illustrating examples of cross-domain routing according to an embodiment. FIGS. 8A-8B are provided as examples only and should not be construed as limiting one or more embodiments.

As illustrated in FIG. 8A, six nodes 806, 808, 810, 812, 814, 816 have sequential network connectivity, with some of the nodes in a high domain 818 and the other nodes in a low domain 820, separated by a domain boundary 802. An enterprise CDS (E-CDS) 804 has connectivity to nodes 810, 812 on either side of the domain boundary 802. In this particular configuration, node 810 is preconfigured to issue a certain subscription that aggregates the need in the low domain 820. Alternatively, subscriptions may be dynamically exchanged across the domain boundary 802. Upon receiving a subscription, node 816 disseminates it to all other nodes in the same domain (in this example, nodes 812 and 814). Upon receiving a publication, node 806 transfers the content over to node 810 (due to the matching subscription), which interacts with the E-CDS 804 to transfer the content to node 812. Node 812, in turn, performs matching and delivers the content to the subscriber on node 816.

In FIG. 8B, the E-CDS 804 is not available, or may not be the "best" option. FIG. 8B illustrates an example of dynamic exchange of a subscription across domain boundaries, with information routing across multiple F-CDS nodes. In this example, since subscription messages are treated as content, nodes 808 and 810 perform F-CDS functionality on a subscription message. Node 810 receives the first actionable subscription in that domain and disseminates the subscription back to nodes 806 and 808 (solid lines). Upon matching the subscription, node 806 determines that the subscription needs to go to the low domain 820. Node 806 performs a lookup in its CDS routing table, to determine the next "best" CDS hop to take, determines that node 808 is a good choice, and disseminates the content to node 808 (dashed line). Node 808 performs a similar action and sends the information to node 810 (dashed line). At this point, node 810 determines that sufficient redundant and divers filtering of the information has been performed (based on a provenance trail) and disseminates the content over node 812 into the low domain 820. In the low domain 820, the information is transitively forwarded to node 816.

In an embodiment, a system includes one or more devices, including one or more hardware processors, that are configured to perform any of the operations described herein and/or recited in any of the claims.

In an embodiment, a non-transitory computer-readable storage medium stores instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 9:
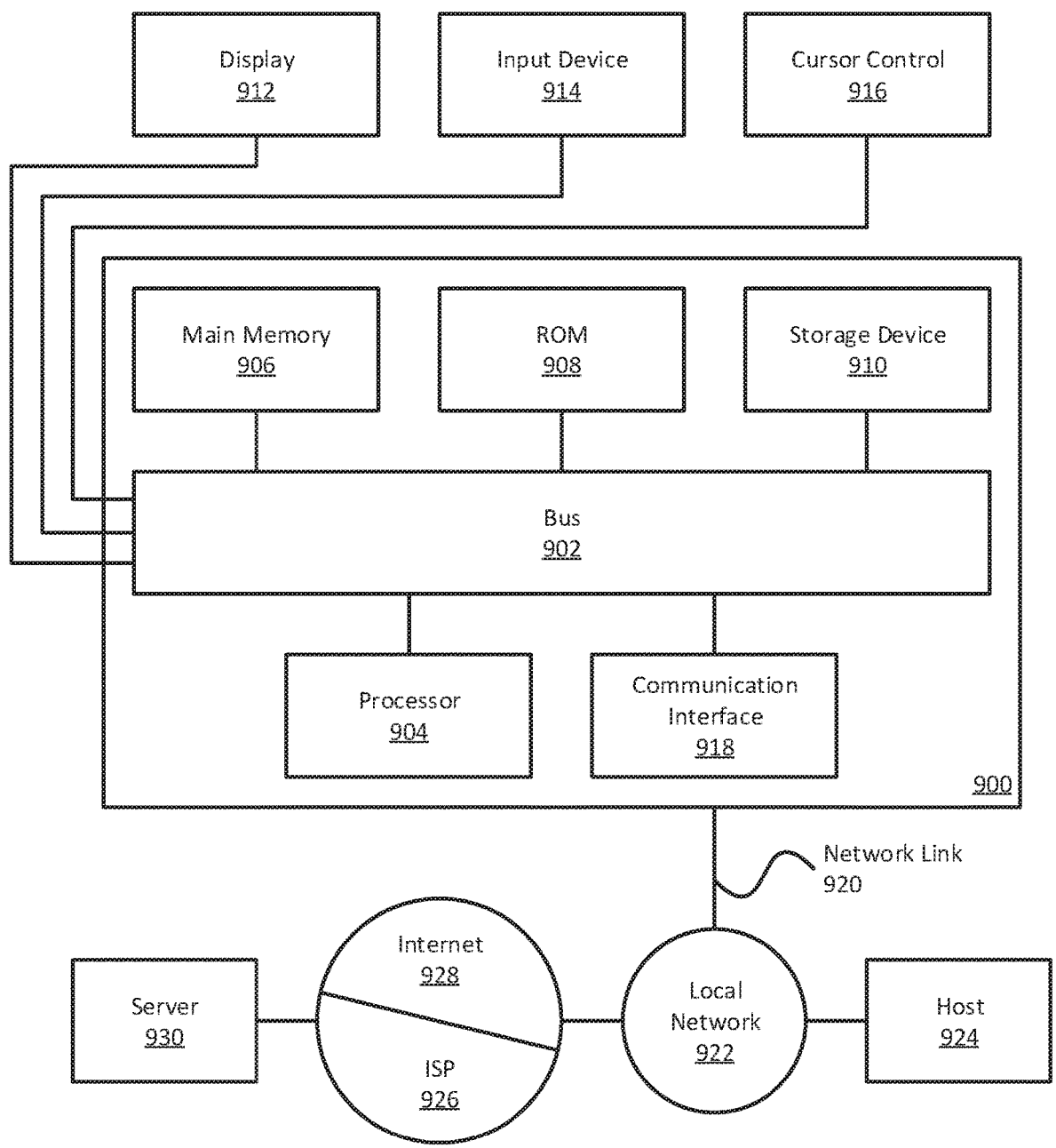
FIG. 9 is a block diagram of an example of a computer system according to an embodiment.

For example, FIG. 9 is a block diagram of an example of a computer system 900 according to an embodiment. Computer system 900 includes a bus 902 or other communication mechanism for communicating information, and a hardware processor 904 coupled with the bus 902 for processing information. Hardware processor 904 may be a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in one or more non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or additionally, computer system 900 may receive user input via a cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Alternatively or additionally, computer system 8 may include a touchscreen. Display 912 may be configured to receive user input via one or more pressure-sensitive sensors, multi-touch sensors, and/or gesture sensors. Alternatively or additionally, computer system 900 may receive user input via a microphone, video camera, and/or some other kind of user input device (not shown).

Computer system 900 may implement the techniques described herein using customized hard-wired logic, one or more ASICs or FPGAs, firmware, and/or program logic which in combination with other components of computer system 900 causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 902. Transmission media may also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 900 may receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922, and communication interface 918.

The received code may be executed by processor 904 as it is received, and/or stored in storage device 910, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory machine-readable media storing instructions that, when executed by one or more processors, cause:
   receiving, by a first intermediate node operating in a first physical device in a first assured pipeline of a fragmented cross-domain solution (CDS), a first data item originating at a source node in a first security domain;
   applying, by the first intermediate node, a first data filter to determine that the first data item complies with a data security requirement of the fragmented CDS;
   transmitting, by the first intermediate node, the first data item to a second intermediate node operating in a second physical device in the first assured pipeline of the fragmented CDS;
   applying, by the second intermediate node, a second data filter to redundantly determine that the first data item complies with the data security requirement of the fragmented CDS; and
   transmitting, by the second intermediate node, the first data item to a recipient node in a second security domain via the first assured pipeline.

2. The one or more non-transitory machine-readable media of claim 1, further storing instructions that, when executed by one or more processors, cause:
   sanitizing, by a third intermediate node operating in a third physical device in the first assured pipeline of the fragmented CDS, the first data item to mitigate a first malicious attack vector; and
   transforming, by a fourth intermediate node operating in a fourth physical device in the first assured pipeline of the fragmented CDS, the first data item from a first data type to a second data type, to mitigate a second malicious attack vector.

3. The one or more non-transitory machine-readable media of claim 1, further storing instructions that, when executed by one or more processors, cause:
   receiving, by a cross-domain router in the fragmented CDS, a plurality of status messages from a plurality of nodes in the fragmented CDS, the plurality of status messages indicating respective data filtering capabilities of the plurality of nodes in the fragmented CDS; and
   determining, by the cross-domain router based at least on the plurality of status messages, that the first assured pipeline satisfies a minimum security requirement for routing the first data item from the source node in the first security domain to the recipient node in the second security domain.

4. The one or more non-transitory machine-readable media of claim 1, further storing instructions that, when executed by one or more processors, cause:
   enforcing attribute-based access control for the first data item along the first assured pipeline.

5. The one or more non-transitory machine-readable media of claim 1, further storing instructions that, when executed by one or more processors, cause:
   enforcing a one-way data flow policy along the first assured pipeline.

6. The one or more non-transitory machine-readable media of claim 1, further storing instructions that, when executed by one or more processors, cause:
   routing a second data item from the source node in the first security domain to the recipient node in the second security domain, via a second assured pipeline in the fragmented CDS,
   wherein routing the second data item comprises applying, by a third intermediate node operating in a third physical device in the second assured pipeline that is different from any node in the first assured pipeline, the first data filter to determine that the second data item complies with the data security requirement of the fragmented CDS.

7. The one or more non-transitory machine-readable media of claim 1, wherein transmitting the first data item to the second intermediate node in the first assured pipeline of the fragmented CDS comprises transmitting the first data item to a plurality of neighboring nodes in the fragmented CDS.

8. A system comprising:
   a first physical device including a first hardware processor; and
   a second physical device including a second hardware processor;
   wherein the system is configured to perform operations comprising:
      receiving, by a first intermediate node operating in the first physical device in a first assured pipeline of a fragmented cross-domain solution (CDS), a first data item originating at a source node in a first security domain;
      applying, by the first intermediate node, a first data filter to determine that the first data item complies with a data security requirement of the fragmented CDS;
      transmitting, by the first intermediate node, the first data item to a second intermediate node operating in the second physical device in the first assured pipeline of the fragmented CDS;
      applying, by the second intermediate node, a second data filter to redundantly determine that the first data item complies with the data security requirement of the fragmented CDS; and
      transmitting, by the second intermediate node, the first data item to a recipient node in a second security domain via the first assured pipeline.

9. The system of claim 8, the operations further comprising:
   sanitizing, by a third intermediate node operating in a third physical device in the first assured pipeline of the fragmented CDS, the first data item to mitigate a first malicious attack vector; and
   transforming, by a fourth intermediate node operating in a fourth physical device in the first assured pipeline of the fragmented CDS, the first data item from a first data type to a second data type, to mitigate a second malicious attack vector.

10. The system of claim 8, the operations further comprising:
   receiving, by a cross-domain router in the fragmented CDS, a plurality of status messages from a plurality of nodes in the fragmented CDS, the plurality of status messages indicating respective data filtering capabilities of the plurality of nodes in the fragmented CDS; and
   determining, by the cross-domain router based at least on the plurality of status messages, that the first assured pipeline satisfies a minimum security requirement for routing the first data item from the source node in the first security domain to the recipient node in the second security domain.

11. The system of claim 8, the operations further comprising:
enforcing attribute-based access control for the first data item along the first assured pipeline.

12. The system of claim 8, the operations further comprising:
enforcing a one-way data flow policy along the first assured pipeline.

13. The system of claim 8, the operations further comprising:
routing a second data item from the source node in the first security domain to the recipient node in the second security domain, via a second assured pipeline in the fragmented CDS,
wherein routing the second data item comprises applying, by a third intermediate node operating in a third physical device in the second assured pipeline that is different from any node in the first assured pipeline, the first data filter to determine that the second data item complies with the data security requirement of the fragmented CDS.

14. A method comprising:
receiving, by a first intermediate node operating in a first physical device in a first assured pipeline of a fragmented cross-domain solution (CDS), a first data item originating at a source node in a first security domain;
applying, by the first intermediate node, a first data filter to determine that the first data item complies with a data security requirement of the fragmented CDS;
transmitting, by the first intermediate node, the first data item to a second intermediate node operating in a second physical device in the first assured pipeline of the fragmented CDS;
applying, by the second intermediate node, a second data filter to redundantly determine that the first data item complies with the data security requirement of the fragmented CDS; and
transmitting, by the second intermediate node, the first data item to a recipient node in a second security domain via the first assured pipeline.

15. The method of claim 14, further comprising:
sanitizing, by a third intermediate node operating in a third physical device in the first assured pipeline of the fragmented CDS, the first data item to mitigate a first malicious attack vector; and
transforming, by a fourth intermediate node operating in a fourth physical device in the first assured pipeline of the fragmented CDS, the first data item from a first data type to a second data type, to mitigate a second malicious attack vector.

16. The method of claim 14, further comprising:
receiving, by a cross-domain router in the fragmented CDS, a plurality of status messages from a plurality of nodes in the fragmented CDS, the plurality of status messages indicating respective data filtering capabilities of the plurality of nodes in the fragmented CDS; and
determining, by the cross-domain router based at least on the plurality of status messages, that the first assured pipeline satisfies a minimum security requirement for routing the first data item from the source node in the first security domain to the recipient node in the second security domain.

17. The method of claim 14, further comprising:
enforcing attribute-based access control for the first data item along the first assured pipeline.

18. The method of claim 14, further comprising:
enforcing a one-way data flow policy along the first assured pipeline.

19. The method of claim 14, further comprising:
routing a second data item from the source node in the first security domain to the recipient node in the second security domain, via a second assured pipeline in the fragmented CDS,
wherein routing the second data item comprises applying, by a third intermediate node operating in a third physical device in the second assured pipeline that is different from any node in the first assured pipeline, the first data filter to determine that the second data item complies with the data security requirement of the fragmented CDS.

20. The method of claim 14, wherein transmitting the first data item to the second intermediate node in the first assured pipeline of the fragmented CDS comprises transmitting the first data item to a plurality of neighboring nodes in the fragmented CDS.

* * * * *